(12) United States Patent
Trudeau

(10) Patent No.: US 9,157,444 B2
(45) Date of Patent: Oct. 13, 2015

(54) SUPERCHARGER TRANSMISSION

(71) Applicant: Eaton Corporation, Cleveland, OH (US)

(72) Inventor: Jon P. Trudeau, Battlecreek, MI (US)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 14/547,041

(22) Filed: Nov. 18, 2014

(65) Prior Publication Data

US 2015/0071765 A1 Mar. 12, 2015

Related U.S. Application Data

(63) Continuation of application No. PCT/US2013/044645, filed on Jun. 7, 2013.

(60) Provisional application No. 61/657,762, filed on Jun. 9, 2012.

(51) Int. Cl.
| | |
|---|---|
| *F02B 39/14* | (2006.01) |
| *F04D 29/40* | (2006.01) |
| *F16H 57/04* | (2010.01) |
| *F04D 25/02* | (2006.01) |
| *F02B 39/04* | (2006.01) |
| *F02B 33/36* | (2006.01) |
| *F04C 29/00* | (2006.01) |
| *B22D 25/02* | (2006.01) |
| *F04D 29/60* | (2006.01) |
| *F04C 18/12* | (2006.01) |

(52) U.S. Cl.
CPC .............. *F04D 25/028* (2013.01); *B22D 25/02* (2013.01); *F02B 33/36* (2013.01); *F02B 39/04* (2013.01); *F02B 39/14* (2013.01); *F04C 29/005* (2013.01); *F04D 29/403* (2013.01); *F04D 29/601* (2013.01); *F04C 18/12* (2013.01); *F16H 57/04* (2013.01); *F16H 57/0424* (2013.01)

(58) Field of Classification Search
CPC ..... F16H 57/04; F16H 57/0424; F04D 25/02; F04D 29/403; F02B 33/36; F02B 39/04; F02B 39/14

See application file for complete search history.

(56) References Cited

U.S. PATENT DOCUMENTS

| | | | | |
|---|---|---|---|---|
| 4,628,768 | A | * | 12/1986 | Omura et al. .................... 74/745 |
| 4,926,642 | A | * | 5/1990 | Buthmann et al. .............. 60/607 |
| 4,951,638 | A | * | 8/1990 | Tsuboi et al. ............... 123/559.1 |
| 5,377,649 | A | | 1/1995 | Matsubara et al. |
| 5,879,259 | A | | 3/1999 | Teraoka et al. |
| 7,299,792 | B1 | * | 11/2007 | Jones et al. ................. 123/559.1 |
| 7,621,263 | B2 | * | 11/2009 | Eybergen et al. .......... 123/559.3 |
| 8,028,524 | B2 | | 10/2011 | Middlebrook et al. |
| 2006/0054410 | A1 | * | 3/2006 | Nakamura et al. ........... 184/6.12 |

(Continued)

*Primary Examiner* — William C Joyce
(74) *Attorney, Agent, or Firm* — Dierker & Associates, P.C.

(57) ABSTRACT

A supercharger transmission includes a first chamber having timing gears operatively disposed therein. A second chamber has transmission gears operatively disposed therein. An oil fill level is defined in the second chamber. A bearing retention wall is disposed between the first chamber and the second chamber. The bearing retention wall includes a return port to allow fluid communication between the first chamber and the second chamber. The return port is an aperture defined in the bearing retention wall below the oil fill level. The bearing retention wall also includes a crosstalk port to allow fluid communication between the first chamber and the second chamber. The crosstalk port is an aperture defined in the bearing retention wall above the oil fill level.

14 Claims, 3 Drawing Sheets

(56) References Cited

U.S. PATENT DOCUMENTS

| | | | |
|---|---|---|---|
| 2007/0169583 A1* | 7/2007 | Reis et al. ................ | 74/606 R |
| 2008/0271719 A1* | 11/2008 | Prior ........................ | 123/559.1 |
| 2009/0260357 A1* | 10/2009 | Prior ........................ | 60/598 |
| 2010/0135771 A1 | 6/2010 | Jones et al. | |

\* cited by examiner

— SUPERCHARGER TRANSMISSION

CROSS-REFERENCE TO RELATED APPLICATIONS

This application is a continuation of International application S.N. PCT/US2013/044645, filed Jun. 7, 2013, which itself claims the benefit of U.S. Provisional Application Ser. No. 61/657,762, filed Jun. 9, 2012, the entire contents of each of which is incorporated by reference herein.

BACKGROUND

Superchargers may be used to increase or "boost" the air pressure in the intake manifold of an internal combustion (IC) engine to increase the horsepower output of the IC engine. The IC engine may thus have an increased horsepower output capability than would otherwise occur if the engine were normally aspirated (e.g., the piston would draw air into the cylinder during the intake stroke of the piston). A conventional supercharger is generally mechanically driven by the engine, and therefore, may represent a drain on engine horsepower whenever engine "boost" may not be required and/or desired. A selectively engageable clutch may be disposed in series between the supercharger input (e.g., a belt driven pulley) and the rotors of the supercharger. A transmission may be disposed in series between the clutch and the rotors of the supercharger.

SUMMARY

A supercharger transmission includes a first chamber having timing gears operatively disposed therein. A second chamber has transmission gears operatively disposed therein. An oil fill level is defined in the second chamber. A bearing retention wall is disposed between the first chamber and the second chamber. The bearing retention wall includes a return port to allow fluid communication between the first chamber and the second chamber. The return port is an aperture defined in the bearing retention wall below the oil fill level. The bearing retention wall also includes a crosstalk port to allow fluid communication between the first chamber and the second chamber. The crosstalk port is an aperture defined in the bearing retention wall above the oil fill level.

BRIEF DESCRIPTION OF THE DRAWINGS

Features and advantages of examples of the present disclosure will become apparent by reference to the following detailed description and drawings, in which like reference numerals correspond to similar, though perhaps not identical, components. For the sake of brevity, reference numerals or features having a previously described function may or may not be described in conjunction with other drawings in which they appear.

DETAILED DESCRIPTION

The present disclosure relates generally to supercharger transmissions. Examples of the supercharger transmission and method disclosed herein may be used to allow oil to flow between two chambers of a supercharger transmission.

Figure 1:
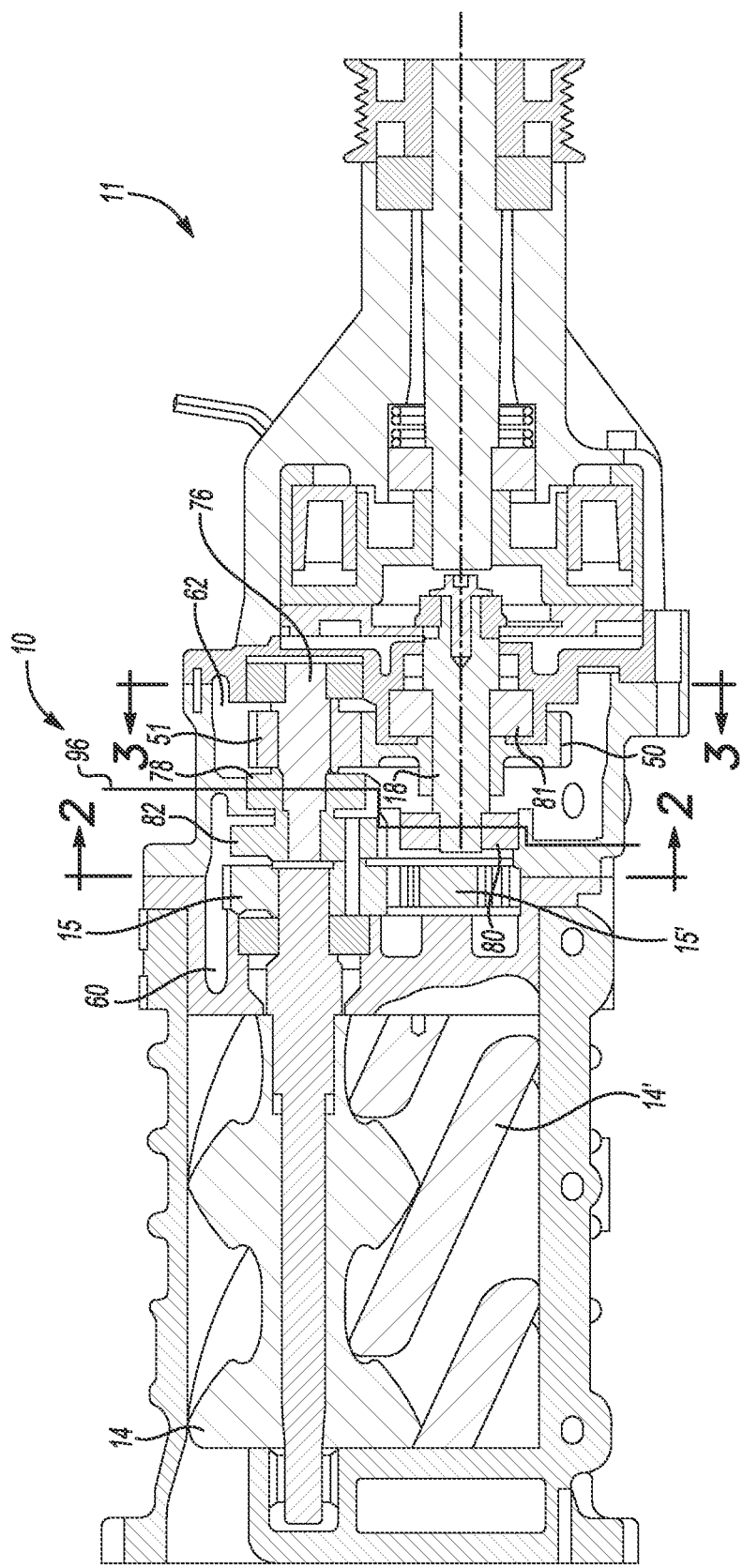
FIG. 1 is a cross-sectional view of an example of a supercharger with an example of a supercharger transmission according to the present disclosure.

Referring now to FIG. 1, the supercharger transmission 10 is divided into two chambers by a bearing retention wall 96. In the example depicted in FIG. 1, a casting forms a portion of a housing of the supercharger transmission 10. The casting includes the bearing retention wall 96 that partitions the supercharger transmission 10 into a first chamber 60 and a second chamber 62. The first chamber 60 has a driving timing gear 15 and a driven timing gear 15' operatively disposed therein. Each timing gear 15, 15' is connected to a respective rotor 14, 14' of the supercharger 11. The timing gears 15, 15' may include an equal number of gear teeth spaced at a relatively high tooth pitch. As such, the timing gears 15, 15' substantially synchronize the rotors 14, 14', thereby contributing to a low wear rate of the rotors 14, 14' and high efficiency of the supercharger 11.

As depicted in FIG. 1, the driving timing gear 15 is connected to a transmission output shaft 76 which is in turn connected to a small step-up gear 51 in a second chamber 62 of the supercharger transmission 10. The transmission output shaft 76 is disposed through an output shaft bearing 78 in the bearing retention wall 96. In an example, the output shaft bearing 78 may be a caged ball bearing. The output shaft bearing 78 may be pressed into the bearing retention wall 96. However, it is to be understood that other suitable methods for retaining the output shaft bearing 78 in the bearing retention wall 96 may be used, for example, staking, clipping with a snap ring, gluing with an adhesive, etc. Other bearing types may be used for the output shaft bearing 78 including roller bearings, journal bearings, pressurized journal bearings, etc.

The second chamber 62 includes a large step-up gear 50 operatively engaging the small step-up gear 51. The large step-up gear 50 is disposed on a transmission input shaft 18 to be rotationally driven by the transmission input shaft 18. In an example, the large step-up gear 50 may be attached to the transmission input shaft 18 by a spline connection. The transmission input shaft 18 may be supported by bearings 80, 81 near each end of the transmission input shaft 18. In an example, the bearings 80, 81 may be caged ball bearings. Other bearing types may be used including roller bearings, journal bearings, pressurized journal bearings, etc. The bearing 80 is disposed in the bearing retention wall 96. The bearing 80 may be pressed into the bearing retention wall 96, or other suitable methods for retaining the bearing 80 in the bearing retention wall 96 may be used, for example staking, clipping with a snap ring, and gluing with an adhesive etc.

Figure 2:
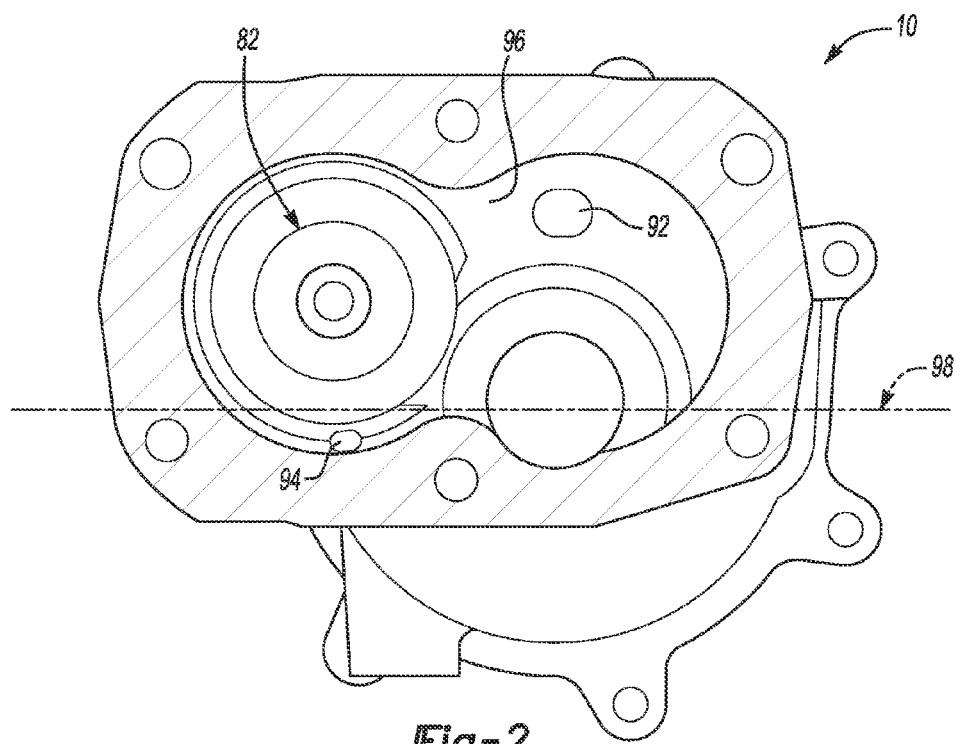
FIG. 2 is a cross-sectional view taken at the bearing retention wall casting according to an example of the present disclosure, viewing in the direction indicated at line 2-2 in FIG. 1.
Figure 3:
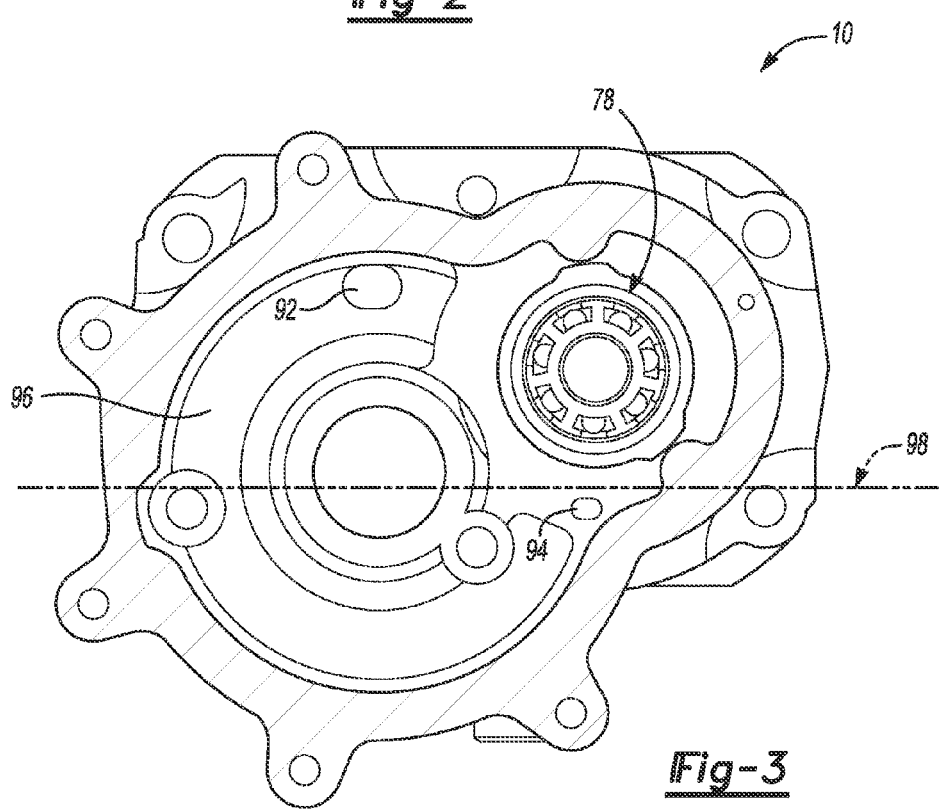
FIG. 3 is a cross-sectional view taken at the bearing retention wall casting, viewing in the direction indicated at line 3-3 in FIG. 1.

FIGS. 2 and 3 depict cross-sectional views (with the gears and some shafts being omitted for clarity) of portions of the supercharger transmission 10. FIG. 2 is taken at an edge of the casting that includes the bearing retention wall 96, viewing in the direction indicated at line 2-2 in FIG. 1. FIG. 3 is taken at an opposite side of the casting that includes the bearing retention wall 96, viewing in the opposite direction, as indicated at line 3-3 in FIG. 1. An oil fill level 98 is established in the supercharger transmission 10.

Since the supercharger 11 and the transmission 10 thereof may be installed on an engine at a variety of orientations, the oil fill level 98 of the supercharger transmission 10 may depend on the installed attitude of the transmission 10 with respect to gravity. Too much oil in a supercharger transmission 10 may lead to excessive foaming of the oil and ultimately a loss of efficiency in the supercharger transmission 10. An insufficient volume of oil may lead to insufficient lubrication and insufficient cooling of the gears in the supercharger transmission 10. The oil fill level 98 is a predetermined level of a surface of a pool of substantially foam-free liquid oil at substantially steady state with the supercharger transmission 10 at a predetermined attitude and in a non-operational (i.e., rotors 14, 14' not turning) state. The oil fill level 98 may be defined in the second chamber 62; however since the first chamber 60 and the second chamber 62 are in fluid communication, the oil fill level 98 may also be defined in the first chamber 60.

In examples of the supercharger transmission 10 of the present disclosure, oil may be installed into the supercharger transmission 10 through an aperture in a transmission housing. Since the first chamber 60 and the second chamber 62 of the transmission 10 are in fluid communication, a single fill point (not shown) may be used to install the oil in both chambers 60, 62 of the supercharger transmission 10. In examples of the present disclosure, a return port 94 disposed in the bearing retention wall 96 may provide fluid communication between the first chamber 60 and the second chamber 62.

Figure 4:
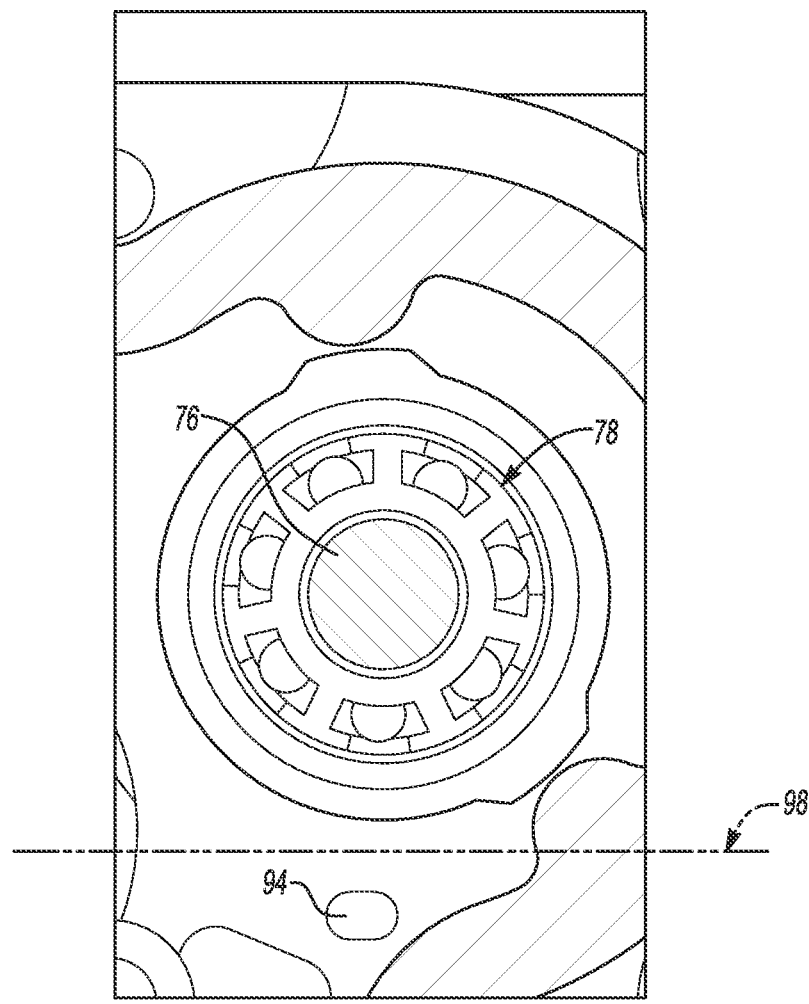
FIG. 4 is an enlarged view of a portion of FIG. 3 showing detail of the bearing according to an example of the present disclosure.

It is recognized that the bearings 78, 80 disposed in the bearing retention wall 96 may allow some oil to flow between the first chamber 60 and the second chamber 62. As can be seen in FIGS. 3 and 4, the output shaft bearing 78 may have openings in the bearing cage that may be expected to allow oil to flow or seep through under certain conditions. Since the output shaft bearing 78 is above the oil fill level 98, it would not be expected that much liquid oil or foam would flow through the bearing 78. However, the input shaft bearing 80 (not shown in FIG. 3) may be similar to the output shaft bearing 78 and have similar openings that may be expected to allow some oil to seep through a portion of the input shaft bearing 80 that is below the oil fill level 98. Yet, it has been discovered that when the bearings 78, 80 installed in the bearing retention wall 96 are operating at normal operational speeds, the flow of oil through the bearings 78, 80 between the first chamber 60 and the second chamber 62 may, in some instances, be relatively low. Examples of the present disclosure advantageously provide improved lubrication and cooling of the supercharger transmission 10 through ports 92 and 94 (discussed further herein).

The flow of oil through the bearings 78, 80 may be expressed as an effective flow area of the bearings. As used herein, effective flow area means an area of a round, sharp-edged orifice that would have an equivalent amount of flow of oil through the sharp-edged orifice as flows through the bearings 78, 80 under the same conditions. As used herein, an effective flow area that is substantially less than another flow area means the effective flow area is less than about one half of the other flow area.

Since the gears in the transmission 10 turn at a relatively high rate of speed when the supercharger 11 is providing boost, a mist of oil suspended in air may be generated by the supercharger transmission 10 during operation of the supercharger transmission 10. In examples of the present disclosure, a crosstalk port 92 is disposed in the bearing retention wall 96 above the oil fill level 98 to allow the oil mist to move between the first chamber 60 and the second chamber 62. It is to be understood that the oil mist may move from the first chamber 60 to the second chamber 62, or from the second chamber 62 to the first chamber 60. The direction of movement of the mist may depend on relative pressures in the first chamber 60 and second chamber 62. For example, if a second pressure in the second chamber 62 is higher than a first pressure in the first chamber 60, the oil mist will move from the second chamber 62 to the first chamber 60 until the first pressure is substantially equalized with the second pressure.

The oil mist may coalesce to liquid oil which tends to collect in the bottoms of the chambers 60, 62. It is to be understood that the gears in the first chamber 60 and the second chamber 62 may churn the liquid oil and cause it to become foamy. For example, air bubbles may be dispersed in the oil.

In an example of the present disclosure, the crosstalk port 92 may be sized to allow pressure equalization between the first chamber 60 and the second chamber 62, and to prevent oil starvation in the first chamber 60 or the second chamber 62. The return port 94 may be sized to allow foamy oil to easily flow through. As shown in FIGS. 2 and 3, the return port 94 is an aperture defined in the bearing retention wall 96 below the oil fill level 98. The crosstalk port 92 is an aperture defined in the bearing retention wall 96 above the oil fill level 98.

In an example, a ratio of a return port flow area to a crosstalk port flow area is about 0.3. For example, the return port flow area may be about 30 square millimeters (sq mm), and the crosstalk port flow area may be about 100 sq mm. In another example, the ratio of the return port flow area to the crosstalk port flow area may range from about 0.1 to about 5.0. The return port flow area may range from about 2 sq mm to about 400 sq mm. The crosstalk port flow area may range from about 20 sq mm to about 500 sq mm.

It is to be understood that any hole shape may be used for the return port 94 and the crosstalk port 92. For example, the ports 92, 94 may be round, oval, rectangular, trapezoidal, or other shapes which allow substantially the same amount of oil or oil mist to pass through as a round hole with a given diameter. The crosstalk port 92 may be the same shape (e.g., round or oval) as the return port 94, however, it is not necessary for the crosstalk port 92 to be the same shape as the return port 94.

In an example, a method of making the supercharger transmission 10 of the present disclosure may include casting the bearing retention wall 96 with the crosstalk port 92 and the return port 94 in the as-cast state. In another example, the crosstalk port 92 and the return port 94 may be machined into the bearing retention wall 96. As used herein, machining may include removing metal to create an aperture in the bearing retention wall 96 using a drill, end mill, ream, punch, laser, water jet, electrical discharge, plasma arc, torch, etc.

In another example, a method of making the supercharger transmission 10 of the present disclosure may include casting the bearing retention wall 96 with a plurality of crosstalk apertures and a plurality of return apertures in the as-cast state. An operational orientation may be chosen with respect to gravity for the supercharger transmission 10. The crosstalk port 92 corresponding with the operational orientation of the supercharger transmission 10 is chosen from the plurality of crosstalk apertures. The return port 94 corresponding with the operational orientation of the supercharger transmission 10 is chosen from the plurality of return apertures. The crosstalk apertures that are not the crosstalk port 92 and the return apertures that are not the return port 94 are plugged. It is to be understood that the plugs may be plastic, rubber, metal, or any other suitable plug material that will seal the apertures for the operational life of the supercharger 11 substantially without leaking.

It is to be understood that the terms "connect/connected/connection" and/or the like are broadly defined herein to encompass a variety of divergent connected arrangements and assembly techniques. These arrangements and techniques include, but are not limited to (1) the direct communication between one component and another component with no intervening components therebetween; and (2) the communication of one component and another component with one or more components therebetween, provided that the one component being "connected to" the other component is somehow in operative communication with the other component (notwithstanding the presence of one or more additional components therebetween).

In describing and claiming the examples disclosed herein, the singular forms "a", "an", and "the" include plural referents unless the context clearly dictates otherwise.

Further, the terms "first," "second," and the like herein do not denote order, quantity, or importance, but rather are used to distinguish one element from another. Reference throughout the specification to "one example", "another example", "an example", and so forth, means that a particular element (e.g., feature, structure, and/or characteristic) described in connection with the example is included in at least one example described herein, and may or may not be present in other examples. In addition, it is to be understood that the described elements for any example may be combined in any suitable manner in the various examples unless the context clearly dictates otherwise.

Still further, it is to be understood that the ranges provided herein include the stated range and any value or sub-range within the stated range. For example, a range from about 2 sq mm to about 400 sq mm should be interpreted to include not only the explicitly recited limits of about 2 sq mm to about 400 sq mm, but also to include individual values, such as 5 sq mm, 82 sq mm, 225 sq mm, etc., and sub-ranges, such as from about 50 sq mm to about 350 sq mm, etc. Furthermore, when "about" is utilized to describe a value, this is meant to encompass minor variations (up to +/−10%) from the stated value.

While several examples have been described, it will be apparent to those skilled in the art that the disclosed examples may be modified. Therefore, the foregoing description is to be considered non-limiting.

What is claimed is:

1. A supercharger, comprising:
   a first supercharger rotor connected to a driving timing gear;
   a second supercharger rotor connected to a driven timing gear, the driven timing gear meshingly engaged with the driving timing gear for synchronized rotation of the first supercharger rotor with the second supercharger rotor; and
   a supercharger transmission, including:
   a first chamber having the timing gears operatively disposed therein;
   a second chamber adjacent to the first chamber, the second chamber having transmission gears operatively disposed therein;
   an oil fill level defined in the second chamber; and
   a bearing retention wall, the bearing retention wall disposed between the first chamber and the second chamber, the bearing retention wall including:
      a return port to allow fluid communication between the first chamber and the second chamber, the return port being an aperture defined in the bearing retention wall below the oil fill level; and
      a crosstalk port to allow fluid communication between the first chamber and the second chamber, the crosstalk port being an aperture defined in the bearing retention wall above the oil fill level.

2. The supercharger as defined in claim 1 wherein a ratio of a return port flow area to a crosstalk port flow area ranges from about 0.1 to about 5.0.

3. The supercharger as defined in claim 2 wherein the ratio of the return port flow area to the crosstalk port flow area is about 0.3.

4. The supercharger as defined in claim 1 wherein the return port has a flow area ranging from about 2 sq mm to about 400 sq mm.

5. The supercharger as defined in claim 4 wherein the return port flow area is about 30 square millimeters.

6. The supercharger as defined in claim 1 wherein the crosstalk port has a flow area ranging from about 20 sq mm to about 500 sq mm.

7. The supercharger as defined in claim 6 wherein the crosstalk port flow area is about 100 square millimeters.

8. The supercharger as defined in claim 1 wherein the crosstalk port is to substantially equalize a first pressure in the first chamber and a second pressure in the second chamber by allowing conveyance of oil mist between the first chamber and the second chamber.

9. The supercharger as defined in claim 1 wherein the return port is to convey liquid oil, oil foam or a combination of liquid oil and oil foam between the first chamber and the second chamber.

10. The supercharger as defined in claim 1 wherein a bearing disposed in the bearing retention wall has an effective flow area substantially less than the return port during rotation of the bearing.

11. The supercharger as defined in claim 1 wherein the oil fill level is a predetermined level of a surface of a pool of substantially foam-free liquid oil at substantially steady state with the supercharger transmission at a predetermined attitude.

12. A method of making the supercharger as defined in claim 1, the method comprising casting the bearing retention wall with the crosstalk port and the return port in an as-cast state.

13. A method of making the supercharger as defined in claim 1, the method comprising:
   casting the bearing retention wall with a plurality of crosstalk apertures and a plurality of return apertures in an as-cast state;
   choosing an operational orientation with respect to gravity for the supercharger transmission;
   choosing the crosstalk port corresponding with the operational orientation of the supercharger transmission from the plurality of crosstalk apertures;
   choosing the return port corresponding with the operational orientation of the supercharger transmission from the plurality of return apertures;
   plugging the crosstalk apertures that are not the crosstalk port; and
   plugging the return apertures that are not the return port.

14. A method of making the supercharger as defined in claim 1, the method comprising:
   casting the bearing retention wall; and
   machining the crosstalk port and the return port into the bearing retention wall.

* * * * *